Jan. 6, 1953 J. B. ATWOOD 2,624,834

DIVERSITY FREQUENCY SHIFT RECEPTION

Filed Sept. 29, 1949 2 SHEETS--SHEET 1

INVENTOR
John B. Atwood
BY Harry Tunick
ATTORNEY

Jan. 6, 1953 J. B. ATWOOD 2,624,834

DIVERSITY FREQUENCY SHIFT RECEPTION

Filed Sept. 29, 1949 2 SHEETS—SHEET 2

INVENTOR
John B. Atwood
BY
ATTORNEY

Patented Jan. 6, 1953 2,624,834

UNITED STATES PATENT OFFICE 2,624,834

DIVERSITY FREQUENCY SHIFT RECEPTION

John B. Atwood, Riverhead, N. Y., assignor to Radio Corporation of America, a corporation of Delaware Application September 29, 1949, Serial No. 118,618

6 Claims. (Cl. 250—8)

Figure 1:
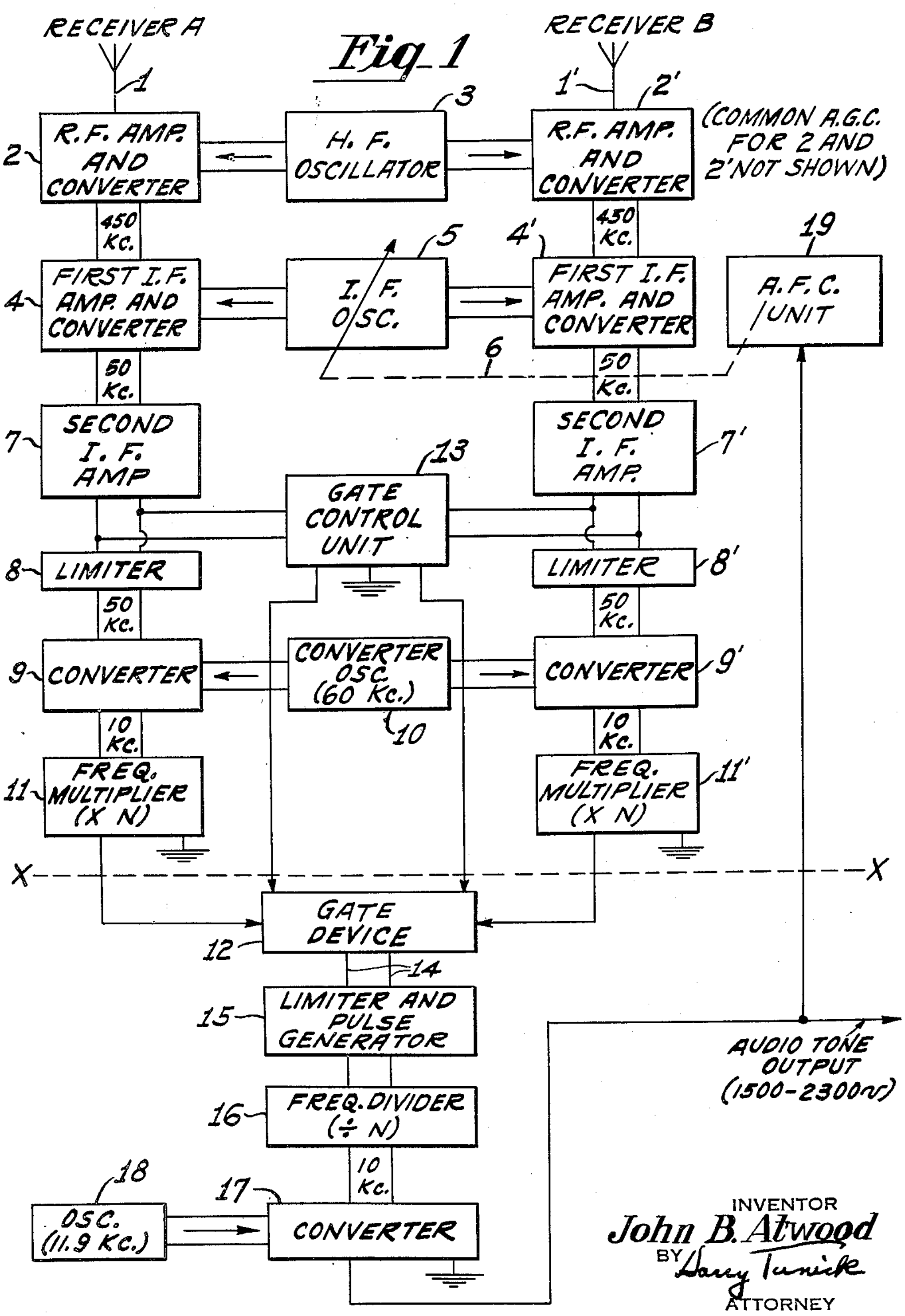

This invention relates to diversity receiving systems, and more particularly to such systems for receiving signals transmitted by shifting the frequency of a radio frequency carrier.

This invention is particularly applicable to the reception of facsimile or radiophoto signals which are transmitted by shifting the frequency of a radio frequency carrier, a total shift on the order of 800 cycles being utilized for the total tonal range from back to white in the picture. The invention will therefore be described herein in connection with a system for receiving radiophoto or facsimile signals. However, it is not limited thereto, and may be used for the diversity reception of frequency shifted telegraphy signals, in which the radio frequency carrier is shifted in accordance with signals from a first frequency representing mark to a second frequency representing space and vice versa.

According to the method in common use at the present time for the transmission and reception of radiophoto signals, 2300 cycles has been established as the "black frequency" and 1500 cycles as the "white frequency," giving a total frequency shift of 800 cycles, these frequencies being those actually utilized at the central office for operation of the picture reproducer itself thereat; hence, the receiver for the new method utilized herein, which may be termed the Radio Frequency Carrier Shift (RFCS) method, should supply these same two frequencies to the central office for a shift of 800 cycles on the received signal.

In addition, there should be no controls or adjustments on the receiver which could cause the frequency shift at the output of the receiver to differ from the shift on the received input signal. Thus, if the receiving equipment is located at a point remote from the central office equipment (for example, if the receiving equipment is located in Riverhead, Long Island, New York, while the central office is in New York city), it would be extremely inconvenient if shift adjustments had to be made at the receiving station in addition to the adjustments necessary at the central office and at the point from which the picture is being transmitted, such as London, for example.

Also, provisions should be made at the receiver for obtaining the benefits achievable from the use of space diversity, such benefits as the effective elimination of random fading due to multipath transmission being rather well-known at the present time.

According to the method in common use at the present time for the transmission and reception of radiophoto signals, which may be termed the Sub-Carrier Frequency Modulation (SCFM) method, an audio frequency tone is shifted in frequency in accordance with the picture elements (from 1500 cycles for white to 2300 cycles for black) and this frequency shifted tone is used to amplitude modulate a carrier, the carrier and both side bands being transmitted. A diversity receiving system for a plurality of channels utilizing the SCFM method is disclosed in the copending Peterson application, Serial No. 634,350, filed December 11, 1945, which ripened on May 15, 1951, into Patent #2,553,271. In such a system for a single channel, the received signals from the diversity intermediate frequency amplifiers are each passed through a separate amplitude modulation detector in the output of each of which appears the frequency shifted tone of audio frequency. These tones are each passed through a separate audio frequency amplifier which is coupled to the corresponding detector by a condenser and transformer, and then through a separate frequency discriminator and detector to a common gate device for diversity switching purposes, or a common frequency discriminator and detector may follow the gate device.

Figure 2:
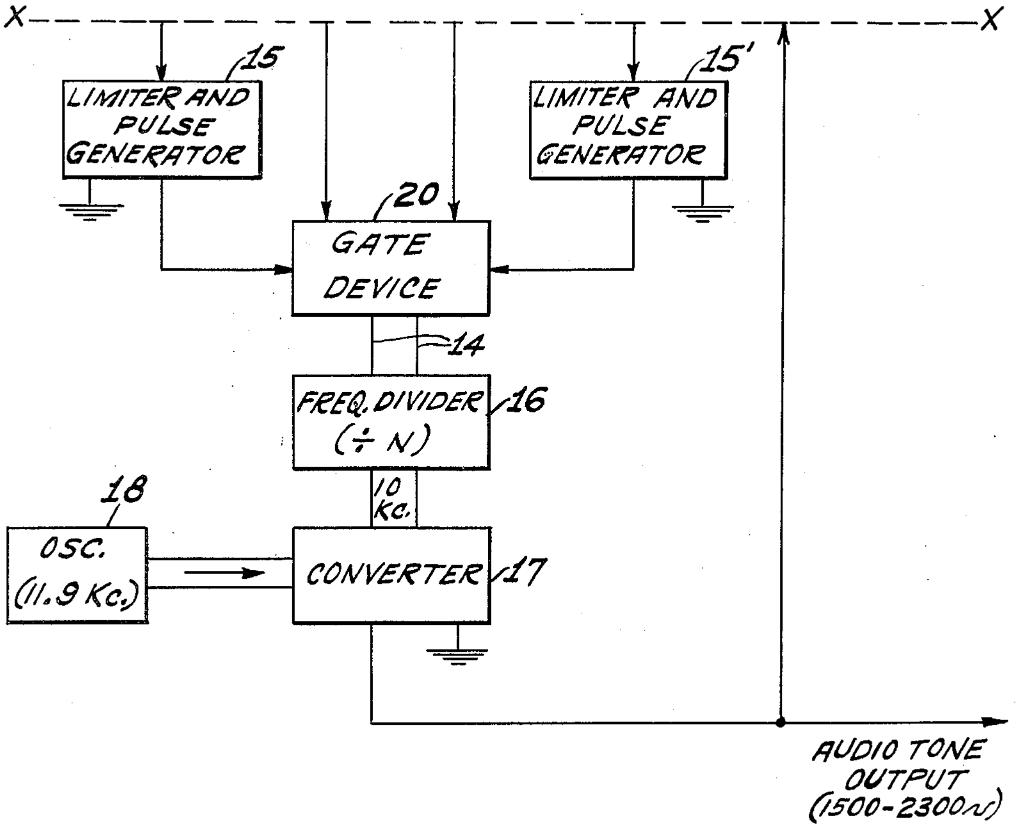

As explained in the aforesaid application, the outputs of the diversity receivers may be out of phase when diversity switching from one receiver to the other takes place, and detection of the phase displaced currents results in distortion; this could be the case disclosed in Fig. 2 of such application, where a common frequency discriminator and detector follows the gate device or gate tube and in which diversity switching takes place before detection. In the arrangement disclosed in Fig. 2 of said application, the frequency shifted tones are multiplied in frequency before the same are applied to the gate device wherein output is switched from one diversity receiver to another, in order to reduce or substantially eliminate the effect of relative phase displacement in the frequency shifted tones derived from the two (or more) diversity receivers.

The present invention is based on the diversity receiving system, including means for reducing switching transients, described in Fig. 2 of the aforesaid Peterson application. To adapt such a system as Peterson's to the RFCS method, in which the radio frequency carrier is itself shifted in frequency in accordance with picture element light values, the obvious thing to do, and a thing which would be done by a person skilled in the art, is to replace the amplitude modulation detectors of Peterson (which are connected to the outputs of his diversity intermediate frequency amplifiers) by frequency modulation discriminators and detectors, which produce a direct current output dependent on the frequency applied thereto.

Now, it is quite possible to have a very large area of substantially black background in a picture being transmitted, so that the radio frequency carrier being received may remain on the same frequency for a rather long period of time, such as two minutes, for example. This means that the output of the two diversity receiver discriminators would be a direct voltage of constant level for this period of time. Diversity switching of the two receivers will very likely occur during this rather long time interval; in order to avoid distortion of the received picture the two discriminators must be initially adjusted so that their frequency-direct current output curves match each other very closely, and moreover this matched condition must be maintained during operation of the receiving apparatus, taking into account temperature variations, etc. This requirement is very difficult if not impossible to meet.

Since the output of the discriminators may under the above conditions be direct voltage of constant level for an extended time, such output will be in effect a zero frequency voltage, which cannot be transmitted through the audio frequency amplifier and the transformer and condenser couplings of the Peterson application.

Furthermore, if the two discriminator outputs are coupled to the gate device to be switched, the gate device must be designed to introduce no distortion into direct voltages passing therethrough, since the output of the discriminators is a varying level direct voltage which may remain at a fixed level for a substantial period of time. The design of a gate device which meets this requirement is very difficult if not impossible.

Again, even if the above difficulties could be overcome, further ones would arise. It will be recalled that, in order to use as much of the existing central office equipment as possible, the RFCS received should supply a "white frequency" of 1500 cycles and a "black frequency" of 2300 cycles to the central office. In order to do this, the gated or selected direct voltage discriminator output must be applied to a reactance tube to frequency modulate an audio oscillator between the frequencies of 1500 and 2300 cycles. Such a reactance tube-audio oscillator arrangement, located at the receiving station, requires frequency adjustment if it is to operate properly. As previously discussed, shift adjustments at the receiving station during the transmission of pictures are inconvenient and should be rendered unnecessary.

The above difficulties and undesirable features, arising from the obvious modification of the Peterson arrangement for RFCS reception, are entirely eliminated by the present invention, while retaining the advantages of such prior arrangement as regards the reduction of transients resulting from phase displacement between signals when diversity switching takes place. In addition, other advantages result from the present invention, as will hereinafter appear.

The manner in which the above difficulties are eliminated, and other advantages are obtained, will now be described in detail. In this description, reference will be made to the accompanying drawings, wherein:

Fig. 1 is a block diagram of a diversity receiving system according to this invention; and Fig. 2 is a block diagram of a modification.

The objects of this invention are accomplished, briefly, in the following manner: The transmitted radio frequency carrier, shifted in frequency in accordance with picture intelligence, is received on a pair of antennas in space or polarization diversity, each version being amplified, heterodyned to a first intermediate frequency, amplified, heterodyned to a second intermediate frequency and amplified and then limited, heterodyned to a third intermediate frequency and multiplied in frequency by a factor N to reduce switching transients before being applied to a controlled gate device. The gate device is controlled by a gate control unit which is connected to, and responsive to, the outputs of the two second intermediate frequency amplifiers. The switched output of the gate device is converted into pulses, divided in frequency by the factor N to reconvert it to the third intermediate frequency and then heterodyned to derive as output of the receiver an audio tone or audio frequency which is frequency-shifted in accordance with picture intelligence. This audio tone output is sampled in an automatic frequency control unit which controls the frequency of the IF oscillator for the second heterodyning. In a modification, pulse generators are inserted between the frequency multipliers and the gate device to convert each signal version to pulses before application to such device, somewhat different gate device operation being utilized in this modification.

Referring now to Fig. 1 of the drawings, the diversity receiving system of this invention begins with two receiving antennas 1 and 1′ which are in space or polarization diversity and which pick up different versions of the RFCS radio-photo signal which is transmitted from the distant transmitting station. The antenna 1 of receiver A feeds a radio frequency amplifier 2 while antenna 1′ of receiver B feeds a radio frequency amplifier 2′. The radio frequency amplifiers 2 and 2′ are of the heterodyne type having a common high frequency oscillator 3 coupled thereto and including converters, whereby the incoming radio frequency carrier, which may have a mean frequency of fifteen megacycles (plus or minus the frequency deviation determined by the light values of the picture being transmitted), is converted or heterodyned down to a mean first I. F. of four hundred fifty kilocycles, as indicated in Fig. 1. This first I. F. in each receiver is amplified in the first I. F. amplifiers 4 and 4′, respectively, which are of the heterodyne type having a common I. F. oscillator 5 coupled thereto and including converters whereby the first I. F., having a maximum frequency shift of 800 cycles, for example (which is the same as the maximum frequency shift of the radio frequency carrier), is converted or heterodyned down to a mean second I. F. of fifty kilocycles, as indicated in Fig. 1. Oscillator 5 is adapted to have its frequency controlled by external means, as indicated in the drawing at 6. The two versions, of second I. F., are amplified in the second I. F. amplifiers 7 and 7′, respectively.

The two versions, having a mean frequency of fifty kilocycles with a maximum total frequency shift of 800 cycles, are fed through respective limiters 8 and 8'. The limiters 8 and 8' are preferably as illustrated in the copending Schock et al. application, Serial No. 632,978, filed December 5, 1945, or in Crosby Patent 2,276,565, dated March 17, 1942. Said Schock et al. application ripened on July 18, 1950 into Patent #2,515,668.

The limited signal versions, still having a mean or center frequency of fifty kilocycles, are fed into respective converters 9 and 9', which are of the heterodyne type having a common converter oscillator 10 of sixty kilocycles coupled thereto, whereby the second I. F. is converted or heterodyned down to a mean third I. F. of ten kilocycles, as indicated in the drawing. This third I. F. has a maximum frequency shift of 800 cycles, the same as the maximum frequency shift of the original R. F. carrier, so that it varies over a range extending from 9.6 to 10.4 kilocycles.

The two versions, having a center frequency of ten kilocycles, are fed into respective frequency multipliers or harmonic generators 11 and 11', which produce waves of substantially sinusoidal shape in their outputs, and then into a common gate device 12. Gate device 12 consists of a pair of gating tubes corresponding to those numbered 80 and 80' in said Schock et al. patent, and arranged and connected as described therein. These gating tubes have their #1 grids connected to the corresponding output leads of a gate control unit 13, and have their #3 grids connected to the corresponding output leads of multipliers 11 and 11'. Such gating tubes function to select output from that receiver getting the better or stronger signal at any particular instant.

The gate control unit 13 is connected to the outputs of the two second I. F. amplifiers 7 and 7' in such a way as to be responsive thereto. Unit 13 includes a differential rectifier and double trigger circuit as shown and described in the said Schock et al. patent, output from receiver A and receiver B being supplied to a differential detector in unit 13 wherein the magnitudes of the outputs are compared and a direct potential is produced which varies in one direction when the signal in receiver B is the better, and in another direction when the signal in receiver A is the better of the two. This signal strength comparing means corresponds fully with the said means as described in the aforementioned Schock et al. patent. This potential operates to trigger a double locking circuit (in 13) to increase (make less negative) the potential on the #1 grid of one or the other of the two gate tubes in device 12, and decrease (make more negative or less positive) the potential on the #1 grid of the other of the gate tubes so that if receiver A gets the better signal one gate tube is opened up and the other is closed, while if receiver B gets the better signal the one gate tube is closed and the other is opened up. Another way to consider the operation of the gate device 12 is to assume that the two tubes therein are biased to cut off and one or the other thereof turned on by the control potential from 13.

The frequency multipliers 11 and 11' multiply the input frequency supplied thereto by N, the multiplication factor of the multipliers. For example, if the currents out of the converters 9 and 9' have a frequency of ten kilocycles ± FS (FS being the amount of frequency deviation due to the signal intelligence), after multiplication the currents out of frequency multipliers 11 and 11' will have a frequency of N (10 kc.±FS); in other words, the deviation due to the signal intelligence is also multiplied by N. The factor N may be any suitable factor, such as sixteen or thirty-two for example; in a practical embodiment of this invention, which was actually built and tested, the multiplication factor of the multipliers was sixteen, so that the output of the multipliers 11 and 11' (fed to gate device 12) had a mean frequency of 160 kilocycles.

It will be noted that the gate device 12 of this invention gates the outputs of the frequency multipliers 11 and 11' rather than zero frequency or direct current, as would the obvious modification of the aforesaid Peterson arrangement for the RFCS method. Thus, according to this invention, the difficulty of designing a gate device, which will gate direct voltages without distortion, is entirely obviated or eliminated.

As previously described, the gate device automatically selects the better (or stronger) of the two signal versions and passes it on to the rest of the circuit, the selected version appearing in the output leads 14 of device 12. The automatic selector, or gate control unit, 13 will switch from one signal version to the other with a difference in level of about 3 db.

The selected signal version appearing at output leads 14 is fed to a limiter and pulse generator 15, the limiter portion of which converts the substantially sinusoidal waves appearing at leads 14 to substantially square waves and the pulse generator portion of which differentiates these square waves to produce pulses. The pulse output of pulse generator 15 is fed to a frequency divider unit 16 which has a division factor of N, so that in the output of 16 there is reobtained the ten-kilocycle means frequency, the same frequency which is produced in the output of converters 9 and 9'. In other words, the divider unit 16 reconverts the selected signal version to the third I. F., and the maximum frequency shift is returned to its original value of 800 cycles. The divider unit 16 is of the conventional electronic-counter-circuit type. Since such units ordinarily operate from inputs of pulse form, pulse generator 15 is utilized to provide the required pulse input for divider 16.

If required, the output of divider 16 may be passed through a tuned circuit to convert it to substantially sinusoidal waveform having a mean frequency of ten kilocycles, which is fed to a converter 17 which is of the heterodyne type having an 11.9-kilocycle oscillator 18 coupled thereto. The converter 17 heterodynes this third I. F. of ten kilocycles down to a center or mean frequency of 1900 cycles, so that the output of such converter is audio tone or audio frequency which varies from 1500 to 2300 cycles in accordance with the signal intelligence or picture values. It will be recalled that the maximum frequency shift at the input of multipliers 11 and 11' is 800 cycles and that such multipliers multiply such shift by N. However, since divider 16 has a division factor of N, the multiplied shift is divided in unit 16 to return it to its original maximum value of 800 cycles. The receiver illustrated in Fig. 1, therefore, supplies final output of 2300 cycles as the "black frequency" and 1500 cycles as the "white frequency" to the central office, for a shift on the received or input signal of 800 cycles, as is desirable.

An A. F. C. unit 19 has its input coupled to the final receiver output, to sample the same. This unit is preferably constructed and arranged as disclosed in my copending application, Serial No. 119,971, filed October 6, 1949, and operates by means of control coupling 6 (which controls the frequency of I. F. oscillator 5) to maintain the "black frequency" in the receiver output at its proper value of 2300 cycles.

It will be noted, from the above description, that the system disclosed is a heterodyne system. Practically speaking, this means that there are no controls or adjustments on the receiver which could cause the frequency shift at the final output of the receiver to differ from the frequency shift of the received radio frequency carrier. Thus, no shift adjustments are necessary at the receiving station during operation of the system for radio-photo reception.

With two receivers A and B for diversity reception, it is essential that each oscillator in the system be common to the two receivers, to prevent sudden frequency changes in the output when diversity switching occurs. However, even with a common oscillator, this switching cannot take place directly at the outputs of the I. F. amplifiers 7 and 7', or at the outputs of the converters 9 and 9', since the two outputs may be out of phase. A sudden phase change at the receiver output produces a frequency shift transient the size of which is proportional to the amount of the phase change, reaching a maximum of 180 degrees. The sudden phase change, in other words, is equivalent to a momentary frequency change and hence shows up on the picture as either a black or white dot, depending on whether the phase is advanced or retarded. The density of these dots is proportional to the phase change.

If the two signal versions are fed through frequency multipliers 11 and 11' and then switched in gate device 12, the maximum transient-producing phase change that can take place due to switching is still 180 degrees. However, if the switched signal is now fed through frequency divider 16, any phase change will be reduced by a factor equal to the factor of frequency division employed. Thus, if a division factor of sixteen is used, a 180 degree phase change will be reduced to 11.25 degrees.

The above operation, that is, the reduction of switching transients by the use of frequency multipliers and a divider, is explained in somewhat different manner in the aforesaid Peterson application, in connection with Fig. 2 thereof. It will be observed that, in the present invention, the advantages obtainable by the carrying on of switching at multiplied frequencies, followed by frequency division, have been retained.

In the system of this invention, since discriminators are not used, requirements as to matching same, etc., are eliminated. Also, since the signal being gated or selected, is of a rather high frequency, such as 160 kilocycles, for example, the gate device itself is quite simple in design and relatively inexpensive. Furthermore, difficulties of adjustment, design, etc., which might arise from the use of a reactance tube-audio oscillator arrangement are entirely eliminated, since such an arrangement is not utilized in the system of the present invention.

The time required for the switching to take place in 12 should be short compared to the time of one cycle of the frequency to be switched, or phase shifts in excess of 180 degrees can occur; such phase shifts would neutralize the benefits obtained by the frequency multiplication and division (that is, the reduction of switching transients and the substantial elimination of dots that could be produced thereby in the received picture). In a system utilizing the principles of this invention, which was actually built and tested, using a multiplication factor N of sixteen, the frequency to be switched was centered at 160 kilocycles, for which frequency the time of one cycle is 6.25 microseconds. A very short switching time such as 0.2 microsecond would represent approximately twelve electrical degrees at this frequency; since the division factor N is sixteen, this would be reduced to only about 0.75 degree in the final receiver output. Such a phase shift in the final output, of course, would be extremely small.

The requirement that the gate switching time be short, compared to the time of one cycle for the frequency being gated, means that the frequency of the input to the multipliers 11 and 11' should be as low as possible, in order to provide a long time for one cycle thereof. However, if the frequency out of the converters 9 and 9' is too low, insurmontable obstacles arise, so that such frequency cannot be too low. The frequency multipliers 11 and 11' may be conventional and may comprise cascaded tube multipliers such as, for example, a series of frequency doublers. Each stage of the multiplier 11 (and also multiplier 11'), in addition to having a multiplication factor of two as desired, also has other multiplication factors, such as three, four, five, etc., so that it produces other harmonics in its output; these undesired harmonics must be separated out by filters. If, now, it be assumed that the input frequency to multiplier 11 is centered at 1.5 kilocycles, for example, and it being assumed for conventience that there is a maximum frequency shift of 1,000 cycles, the input to multiplier 11 varies from one to two kilocycles. The filter of the third cascaded stage of such multiplier, in the output of which is desired a frequency eight times the original frequency, must pass 8–16 kilocycles, while the filter of the succeeding stage, which again multiplies by two as desired, must pass 16–32 kilocycles. Since the third cascaded stage of the multiplier multiplies by three as well as by two, producing a frequency of twelve times the original frequency in its output, there would appear in such output a frequency range of 12–24 kilocycles, centered at the twelfth harmonic of the original 1.5-kilocycle center frequency. Since this frequency range overlaps the desired range of 8–16 kilocycles which must be passed by the filter of the third stage, it is impossible to separate out and reject, by filtering, this undesired harmonic frequency range of 12–24 kilocycles. In other words, if the frequency out of the converters 11 and 11' is too low, undesired frequencies cannot be eliminated from the output of the multipliers 11 and 11', resulting in interference in the received picture; therefore, the output frequency of the converters 9 and 9' should be made sufficiently high to permit proper elimination of undesired harmonics from the multiplier outputs.

On the other hand, the frequency into the multipliers cannot be made too high, for then other difficulties arise. If for example, the converters 9 and 9' and the oscillator 10 were omitted, a center frequency of fifty kilocycles would be fed into the multipliers 11 and 11'. Assuming a multiplication factor N of sixteen, the frequency divider 16 would be operating at an input frequency of 800 kilocycles. Dividers which are designed to operate at this rather high input frequency will not operate satisfactorily when such input frequency differs only very slightly therefrom. Now, if the two inputs to the gate device 12 happen to be 180 degrees out of phase at the switching moment, the divider 16 must operate momentarily at double the frequency which is being gated, which double frequency would be 1600 kilocycles under the conditions assumed. This momentary input frequency differs materially from the normal input frequency of 800 kilocycles, so that the divider (which is designed to operate at 800 kilocycles) does not operate properly during this switching moment, thereby producing interference in the received picture. This interference would be even more pronounced for a multiplication factor N of thirty-two. Therefore, the input frequency to the multipliers should be kept low, in order to avoid improper functioning of the divider due to the necessity of such divider being designed for a rather high input frequency, the divider being capable of functioning properly, for input frequencies quite different from that for which it is designed, only if it is designed for a rather low input frequency.

Taking into account all of the above considerations, it has been determined that ten kilocycles is an appropriate or desirable center frequency to be supplied to the inputs of the multipliers 11 and 11'. Therefore, converters 9 and 9' and the 60-kilocycle heterodyne oscillator 10 are utilized between limiters 8 and 8' and multipliers 11 and 11', respectively, in order to heterodyne down or beat down the 50-kilocycle output of the limiters to ten kilocycles.

It is desired to be pointed out that the advantages set forth are obtained in this invention mainly by utilizing a center frequency in the I. F. range as the frequency to be gated or switched for diversity purposes, and by operating the gate control unit by an input in the I. F. range, this input being of a frequency different from the frequency which is being gated.

Fig. 2 illustrates a modified system which combines the steps of multiplying before gating and dividing after gating (thus reducing switching transients) with a pulse gate step. Now referring to Fig. 2, in which elements the same as those of Fig. 1 are denoted by the same reference numerals, the apparatus and units above the line X—X in Fig. 1 are duplicated in Fig. 2, so that Fig. 2 consists of a modified arrangement of the units below the line X—X in Fig. 1. In Fig. 2, a combined limiter and pulse generator is inserted between the output of each frequency multiplier (11 and 11') and the gate device 20, these combined limiters and pulse generators being denoted by 15 and 15' and being exactly similar to the limiter and pulse generator 15 in Fig. 1.

It has been found that a difficulty, not previously mentioned, arises during operation of the gate device 12 of Fig. 1. The gate device 12 operates in such a way that plate current is flowing in each one of the gate tubes during the entire time it is open. Now, when gate control unit 13 operates to open up one of the gate tubes (the one which was previously closed) and to close the gate tube which was previously open, plate current in one tube is increased from zero to a certain finite value and in the other tube is reduced from the said finite value to zero, during the switching interval. The plate currents of the two gate tubes cannot be dynamically balanced during the switching interval, so that a switching transient appears at the gate output during the switching interval, due to a momentary change or dip in plate current in such output during such interval. This switching transient is produced entirely independently of the diversity signals being gated, and in fact will appear at the gate output even when the outputs of the multipliers 11 and 11' are grounded (and not applied to the gate tubes), when switching takes place in the gate device due to operation of control unit 13. Such transient passes through units 15, 16 and 17, and produces undesirable results in the received picture.

Even if it were possible to dynamically balance the plate currents of the two gate tubes for equal voltage changes on their #1 grids, which are connected to control unit 13, this difficulty would still not be overcome. It is necessary, in order to prevent that alternating voltage output, of the multiplier 11 or 11' which has the weaker output, from being passed through its corresponding gate tube, to bias such corresponding gate tube substantially beyond cutoff. For example, if cutoff occurs at —10 volts (on grid #1 with respect to the cathode), it may be necessary to bias the "closed" gate tube, by unit 13, to —25 volts, while the "open" gate tube may be biased to —3 volts. Now, if switching occurs, a voltage change of only 7 volts (from —3 volts to the —10 volts cutoff point) is necessary in the "open" tube to decrease its plate current from the predetermined finite value (corresponding to —3 volts grid bias) to zero plate current at cutoff. On the other hand, a voltage change of 22 volts (from —25 volts to —3 volts) is necessary in the "closed" tube to increase its plate current from zero to said predetermined finite value. Thus, a change of 7 volts on the #1 grid of the previously open tube must occur to bring its plate current down to zero, while a highly unequal change of 22 volts on the #1 grid of the previously closed tube must occur to bring its plate current up to the predetermined value.

Fig. 2 overcomes this difficulty by converting the outputs of the limiters in units 15 and 15' into pips or pulses by differentiating in 15 and 15' the square wave outputs of the limiters, and then gating the pips. Thus, there are applied to the #3 grids of the two tubes of gate device 20 not substantially sinusoidal waves, as in Fig. 1, but instead successions or trains of positive pulses the repetition rate of which varies according to picture values, these pulses being fed from units 15 and 15' into device 20.

In gate device 20 biases are provided which are more negative than those utilized in gate device 12. The particular gate tube in device 20 which is opened up by control unit 13, and which is to pass the pulses from unit 15 or 15', is biased to cutoff and the other gate tube is biased substantially beyond cutoff. Both gate tubes are fed positive pulses, as previously explained, the pulses being fed to the #3 grids of both tubes. These pulses are of such an amplitude that they produce no effect on the gate tube which is biased way beyond cutoff. However, they will produce an effect on that gate tube which is biased just to cutoff; they will cause this tube to conduct, since they are of positive polarity, producing a negative pulse in its output for each positive input pulse.

The positive pips fed to the tubes of gate device 20 occur at a rate of one pip for each cycle of the alternating current output of multipliers 11 and 11'. These pips are of short duration compared to the time intervals between pips.

Since one gate tube is biased just to cutoff and the other is biased way beyond cutoff, there is no plate current flowing in either tube during the intervals between pips, no matter which gate tube is to pass pulses. The gate device 20 will generally be operated or switched in the interval between two pips, and since there is no plate current flow in either gate tube at this time, there can be no direct current switching transient produced in gate device 20, such as is produced in gate device 12.

Even if the gate device is operated during the passage of a pip, at which time there is plate current flowing in the open gate tube, only one pip will be distorted. This has very little effect on the shape of a signal element because a signal element is made up of many pips; it will be remembered that there is one pip per alternating current cycle and that the output frequency of multipliers 11 and 11' may be centered at 160 kc.

Since in Fig. 2 the input to the gate device 20, and also the output thereof, already consists of pulses, no pulse generator is needed between the output of device 20 and the input of the frequency divider 16 for proper operation of such divider; therefore, output leads 14 of gate device 20 are connected directly to the input of divider 16. The output of divider 16 is centered at ten kilocycles, as in Fig. 1, and this output is converted (in converter 17) to a center audio frequency of 1900 cycles by means of the 11.9-kilocycle oscillator 18, as in Fig. 1. A portion of the audio tone output, which can vary from a maximum "black frequency" of 2300 cycles to a minimum "white frequency" of 1500 cycles, is taken off for use in the A. F. C. unit which controls the frequency of the I. F. oscillator 5. The audio tone output of the receiver, as in Fig. 1, is fed to suitable equipment at the central office.

What I claim to be my invention is:

1. A diversity system for receiving frequency shifted carrier energy of radio frequency, comprising a pair of radiant energy intercepting devices, a separate receiver coupled to each of said devices, said receivers each including converting means for converting the energy in each receiver to a frequency in the intermediate frequency range, both said converting means being of the heterodyne type and both being supplied with heterodyning energy, means coupling the intermediate frequency output of each of said converting means to a respective frequency multiplier having a multiplication factor of N, means coupling the outputs of said multipliers to a common gate device which is controllable to pass one or the other of such outputs to a common output circuit, signal strength sensing means excited by the signals in each of said receivers for producing a control potential the character of which depends upon which of the two signals is stronger, means for controlling said gate device by said control potential, whereby such device passes the stronger of the two multiplier outputs to said circuit, and means coupling a frequency divider having a division factor of N to said circuit, said last-named means including a pulse generator for converting the substantially sinusoidal outputs of said gate device and of said multipliers to pulses for application to said divider.

2. A diversity system for receiving frequency shifted carrier energy of radio frequency, comprising a pair of radiant energy intercepting devices, a separate receiver coupled to each of said devices, said receivers each including converting means for converting the energy in each receiver to a frequency in the intermediate frequency range, both said converting means being of the heterodyne type and both being supplied with heterodyning energy, means coupling the intermediate frequency output of each of said converting means to a respective frequency multiplier having a multiplication factor of N, means coupling the outputs of said multipliers to a common gate device which is controllable to pass one or the other of such outputs to a common output circuit, said last-named means including a pulse generator for converting the substantially sinusoidal outputs of said multipliers to pulses of a single polarity for application to said gate device, signal strength sensing means excited by the signals in each of said receivers for producing a control potential the character of which depends upon which of the two signals is stronger, means for controlling said gate device by said control potential, whereby such device passes the stronger of the two multiplier outputs to said circuit, and means coupling a frequency divider having a division factor of N to said circuit.

3. A diversity system for receiving frequency shifted carrier energy of radio frequency, comprising a pair of radiant energy intercepting devices, a separate receiver coupled to each of said devices, said receivers each including first heterodyning means for converting the energy in each receiver to a first frequency in the intermediate frequency range and second heterodyning means for converting the output frequency of said first means to a second frequency in the intermediate frequency range, means coupling the intermediate frequency output of each of said second means to a respective frequency multiplier having a multiplication factor of N, means coupling the outputs of said multipliers to a common gate device which is controllable to pass one or the other of such outputs to a common output circuit, signal strength sensing means excited by the outputs of the first heterodyning means of the two receivers for producing a control potential the character of which depends upon which of the two last-named outputs is stronger, means for controlling said gate device by said control potential, whereby such device passes the stronger of the two multiplier outputs to said circuit, means coupling a frequency divider having a division factor of N to said circuit to reconvert the output of said gate device to said second frequency in the intermediate frequency range, said last-named means including a pulse generator for converting the substantially sinusoidal outputs of said gate device and of said multipliers to pulses for application to said divider, and heterodyning means coupled to the output of said divider to convert such output to a frequency in the audio range.

4. A diversity system for receiving frequency shifted carrier energy of radio frequency, comprising a pair of radiant energy intercepting devices, a separate receiver coupled to each of said devices, said receivers each including first heterodyning means for converting the energy in each receiver to a first frequency in the intermediate frequency range and second heterodyning means for converting the output frequency of said first means to a second frequency in the intermediate frequency range, means coupling the intermediate frequency output of each of said second means to a respective frequency multiplier having a multiplication factor of N, means coupling the outputs of said multipliers to a common gate device which is controllable to pass one or the other of such outputs to a common output circuit, said last-named means including a pulse generator for converting the substantially sinusoidal outputs of said multipliers to pulses of a single polarity for application to said gate device, signal strength sensing means excited by the output of the first heterodyning means of the two receivers for producing a control potential the character of which depends upon which of the two last-named outputs is stronger, means for controlling said gate device by said control potential, whereby such device passes the stronger of the two multiplier outputs to said circuit, means coupling a frequency divider having a division factor of N to said circuit to reconvert the output of said gate device to said second frequency in the intermediate frequency range, and heterodyning means coupled to the output of said divider to convert such output to a frequency in the audio range.

5. A diversity system for receiving frequency shifted carrier energy of radio frequency, comprising a pair of radiant energy intercepting devices, a separate receiver coupled to each of said devices, said receivers each including converting means for converting the energy in each receiver to a frequency in the intermediate frequency range, both said converting means being of the heterodyne type and both being supplied with heterodyning energy, a separate frequency multiplier having a multiplication factor of N coupled to the intermediate frequency output of each respective one of said converting means, means coupling the outputs of said multipliers to a common gate device which is controllable to pass one or the other of such outputs to a common output circuit, signal strength sensing means excited by the signals in each of said receivers for producing a control potential the character of which depends upon which of the two signals is stronger, means for controlling said gate device by said control potential, whereby such device passes the stronger of the two multiplier outputs to said circuit, and means coupling a frequency divider having a division factor of N to said circuit, one of said coupling means including a pulse generator for converting the substantially sinusoidal waves applied to its input to pulses at its output.

6. A diversity system for receiving frequency shifted carrier energy of radio frequency, comprising a pair of radiant energy intercepting devices, a separate receiver coupled to each of said devices, said receivers each including first heterodyning means for converting the energy in each receiver to a first frequency in the intermediate frequency range and second heterodyning means for converting the output frequency of said first means to a second frequency in the intermediate frequency range, a separate frequency multiplier having a multiplication factor of N coupled to the intermediate frequency output of each respective one of said second means, means coupling the outputs of said multipliers to a common gate device which is controllable to pass one or the other of such outputs to a common output circuit, signal strength sensing means excited by the outputs of the first heterodyning means of the two receivers for producing a control potential the character of which depends upon which of the two last-named outputs is stronger, means for controlling said gate device by said control potential, whereby such device passes the stronger of the two multiplier outputs to said circuit, means coupling a frequency divider having a division factor of N to said circuit to reconvert the output of said gate device to said second frequency in the intermediate frequency range, one of said coupling means including a pulse generator for converting the substantially sinusoidal waves applied to its input to pulses at its output, and heterodyning means coupled to the output of said divider to convert such output to a frequency in the audio range.

JOHN B. ATWOOD.

REFERENCES CITED

The following references are of record in the file of this patent:

UNITED STATES PATENTS

| Number | Name | Date |
|---|---|---|
| 1,922,282 | Bellescize | Aug. 15, 1933 |
| 2,249,425 | Hansell | July 15, 1941 |
| 2,253,867 | Peterson | Aug. 26, 1941 |
| 2,302,951 | Peterson | Nov. 24, 1942 |
| 2,306,687 | Cox | Dec. 29, 1942 |
| 2,392,693 | Purington | Jan. 8, 1946 |
| 2,491,810 | Guanella | Dec. 20, 1949 |
| 2,494,309 | Peterson et al. | Jan. 10, 1950 |
| 2,495,826 | Schock | Jan. 31, 1950 |
| 2,543,256 | Peterson | Feb. 27, 1951 |
| 2,555,557 | Peterson et al. | June 5, 1951 |